H. H. GOE.
BRICK MACHINE.
APPLICATION FILED DEC. 10, 1918.
1,344,880.
Patented June 29, 1920.
4 SHEETS—SHEET 1.
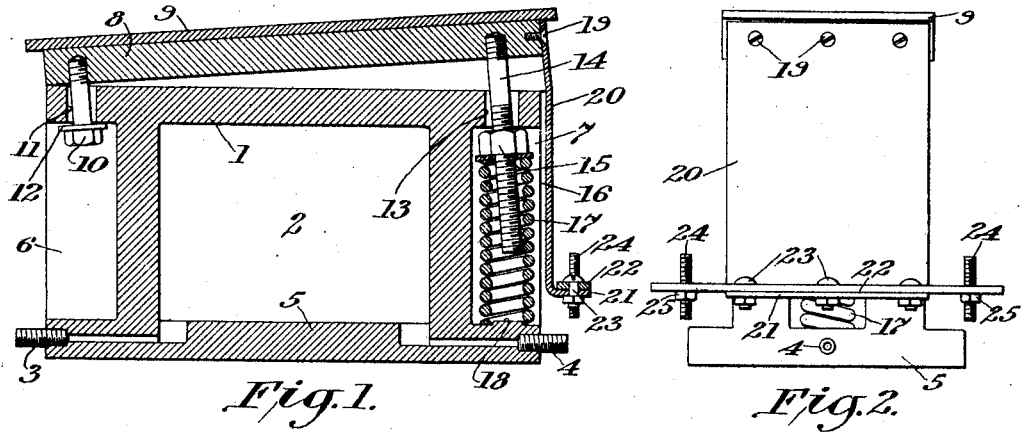
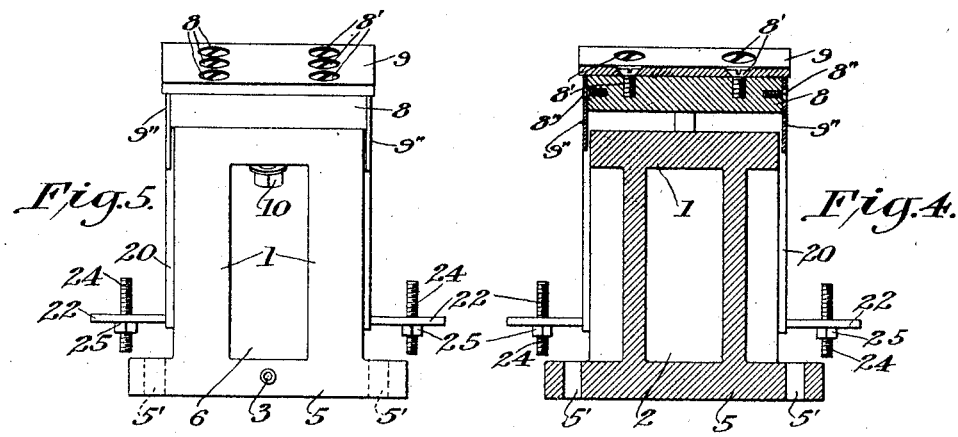
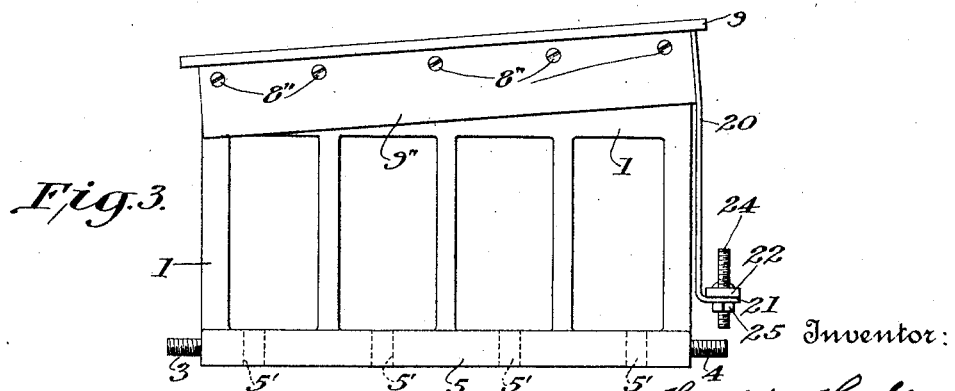
Inventor:
Harold H. Goe,
By Byrnes, Townsend & Dickinson,
Attorneys.

H. H. GOE.
BRICK MACHINE.
APPLICATION FILED DEC. 10, 1918.

1,344,880.

Patented June 29, 1920.
4 SHEETS—SHEET 2.

Inventor:
Harold H. Goe,
By Byrnes Townsend & Dickinstein
Attorneys.

H. H. GOE.
BRICK MACHINE.
APPLICATION FILED DEC. 10, 1918.

1,344,880.

Patented June 29, 1920.
4 SHEETS—SHEET 4.

Inventor:
Harold H. Goe,
By Byrnes, Townsend & Bickenstein
Attorneys.

UNITED STATES PATENT OFFICE.

HAROLD H. GOE, OF ANACONDA, MONTANA.

BRICK-MACHINE.

1,344,880.  Specification of Letters Patent.  Patented June 29, 1920.

Application filed December 10, 1918. Serial No. 266,073.

*To all whom it may concern:*

Be it known that I, HAROLD H. GOE, a citizen of the United States, residing at 611 Maple street, Anaconda, in the county of Deer Lodge and State of Montana, have invented certain new and useful Improvements in Brick-Machines, of which the following is a specification.

The present invention has relation to improvements in brick machines and more particularly to machines for making taper brick. The type of machine to which the improvements are especially directed is the dry press machine and the parts to which the invention is particularly applied are the dies and auxiliary devices for the manufacture of taper brick.

It has been found by experience that most devices employed for the particular purpose of making taper bricks do not produce bricks of uniform density, are complicated and inefficient in working qualities.

It is the general object of this invention to provide a machine for making taper bricks of substantially uniform density.

It is a more particular object to produce taper bricks of substantially uniform density without the employment of auxiliary devices involving a complex machine and a tedious operation or in other words to provide a machine which is absolutely self contained, simple and rigid, performs its function in a simple manner and is readily adjustable for universal adaptation.

These and other objects, advantages and results will be better apparent from the following detailed description in connection with the accompanying drawings in which—

Figure 1 represents a longitudinal section through a lower die embodying the invention;

Figs. 2, 3, 4 and 5 are right-hand end view, side elevation, transverse section and left-hand end view thereof, respectively;

Figure 16:
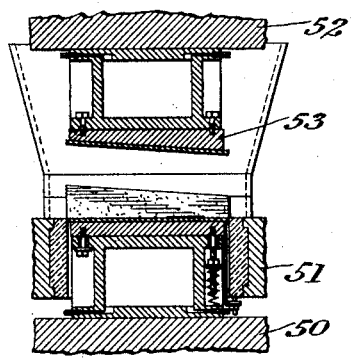
Figure 17:
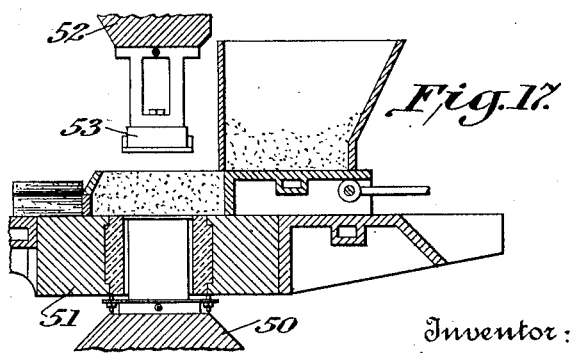
Figures 18, 19:
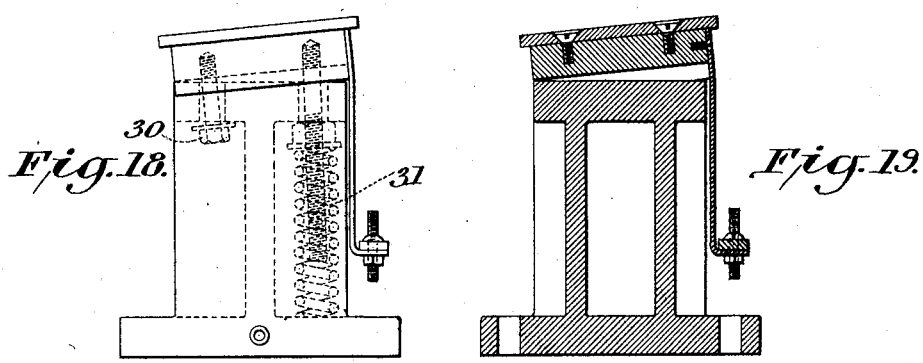
Figure 20:
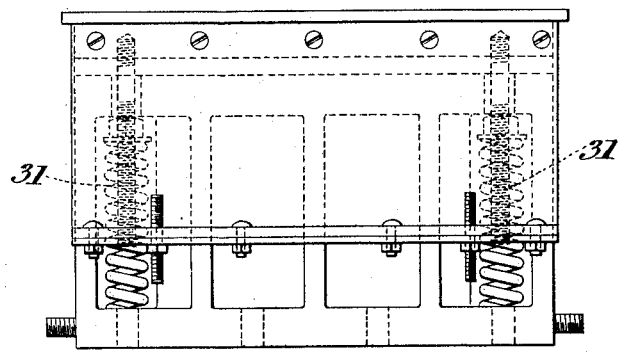

Figs. 7, 9, 11, 13, 15 and 17 are similar sectional views taken at right angle to Figs. 6, 8, 10, 12, 14 and 16, respectively; and Figs. 18, 19 and 20 represent a side elevation, transverse section and an end elevation, respectively, of a slightly modified form.

Having reference to Figs. 1–5 inclusive, which represent an end-wedge lower die, 1 indicates a cast iron block of standard size and proportions, with a steam jacket core 2, inlet steam connection 3, outlet steam connection 4 coupled by standard methods well known in the art. The base 5 of the block 1 is provided with a plurality of holes 5' for bolting the die block 1 to the die head 50 (see Figs. 6–17) of a dry press brick machine. The steam jacket core 2 is centrally located, leaving beyond the ends thereof spaces 6 and 7. A cast iron plate 8, to which is fastened by means of screws 8' the regular die plate 9, is hinged at one end of the die block 1. While any suitable hinge connection may be chosen for this purpose, I prefer to use one or more cap screws 10 passing through an enlarged opening 11 provided in the die block above the space 6. A washer 12 is preferably used to compensate for the enlarged opening. This simple method of hinging permits the plate 8 to be raised and lowered at the opposite end.

Through an enlarged opening 13 through the block 1 above the space 7 extends a stud or pin 14 for yieldingly or resiliently supporting the plates 8 and 9 upon the die block 1. This pin is threaded for a considerable length adjacent its lower end to give adjusting nut 15 sufficient range for changing the inclination of plates 8 and 9. Under this adjusting nut is a spring seat washer 16 so that plates 8 and 9 are carried on a coil 17 of sufficient carrying capacity to support plates 8 and 9 and the load of material for making the brick. This spring coil 17 is held in adjusted position in the space 7 by a circular lug 18 projecting from the base of the block. It will be readily seen that by the above construction of hinging plates 8 and 9 in unit at one end of the die block 1 and supporting the opposite end upon some flexible or resilient support such as spring 17 or other equivalent means, the plates 8 and 9 may be compressed flat or level with the top of the die block, while when the spring is free to act, the plates 8 and 9 are forced upwardly to assume an angular or inclined position. To the sides of the plate 8 are fastened by means of screws 8″ plates 9‴ to protect the angular space intermediate plate 8 and die block 1.

To the end of the plate 8 opposite the pivot connection is attached by screws 19 or otherwise an arm 20 having preferably the form of a plate extending across the whole width of the block 1. The lower end of the plate 20 is flanged at 90° and this flange 21 carries a flat bar 22 being connected thereto by bolts 23. The bar 22 extends at both sides beyond the side walls of the die block 1 so as to engage underneath the die box table 51 (see Figs. 6–17). Through the bar 22 extend vertical screws or studs 24 which may be locked on bar 22 in adjusted vertical position by nuts 25.

The operation, which is clearly illustrated in Figs. 6–17, is as follows:

The upper die, which is carried by upper die head 52 consists of a die block, similar to the lower die block 1 and a wedge 53 fastened thereto by screws 53′. The lower surface of this wedge 53 constitutes the operating surface of the upper die and produces the taper of the brick. The feed hopper 54 and the feed tray 55 are the old and well known means for feeding the material into the die box 56 in the table 51 and need not be described in detail.

Assuming that the lower die had a permanent horizontal working surface, then the material passed into the die box 56 would have the same height throughout the box. Since, however, the upper die is wedge shaped to produce the taper, the material would be more compressed at one side than at the other. The thin end of the brick would therefore have a greater density than the base end and the density would decrease from one to the other. By means of the tilting position of the plates 8 and 9 the material is distributed in the die box in the direction of the taper so that more material is received at one side than at the other and this distribution is graded by the inclined plane of the plates 8 and 9. As the upper die descends in its compression stroke, it finds the material so distributed that the rate of change of density during compression is substantially uniform throughout the body of the material compressed and that consequently the density is substantially uniform throughout the compressed body after the brick is formed.

Figure 6:
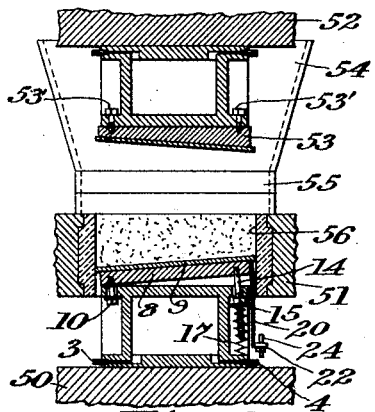
Figs. 6, 8, 10, 12, 14 and 16 are fragmentary sectional views through a machine embodying the invention and showing different positions during a cycle of operation.
Figure 7:
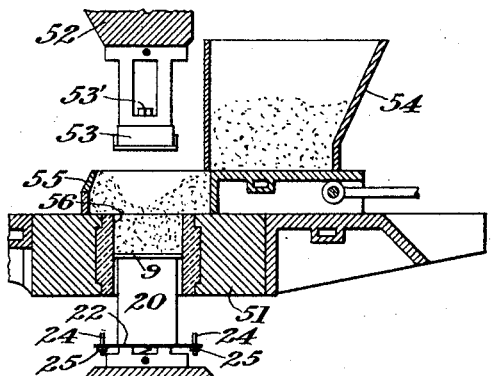

Figs. 6 and 7 represent the filling of the die box with material. The feed tray 55 is just over the die box and has discharged its content. The plates 8 and 9 are in the inclined position to which they are adjusted by means of screw stud 14 and nut 15. The material is distributed in the die box substantially is accordance with the taper to be formed.

Figure 8:
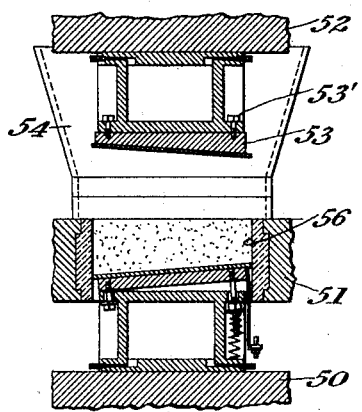
Figure 9:
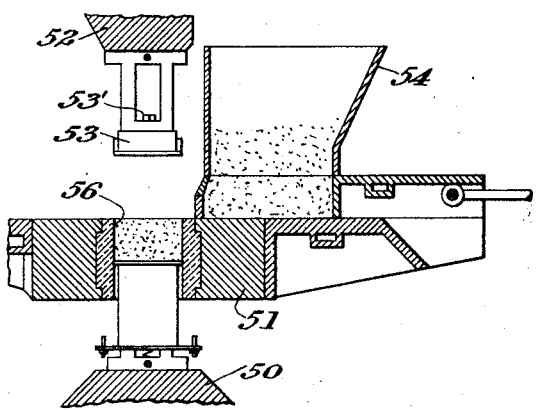

Figs. 8 and 9 show the feed tray withdrawn and the upper die ready to descend for compression.

Figure 10:
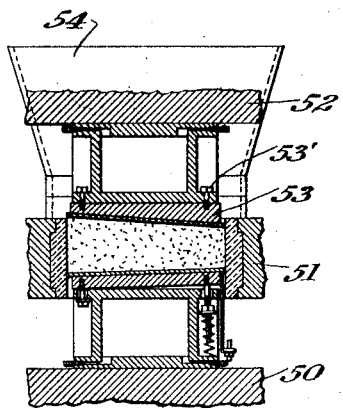
Figure 11:
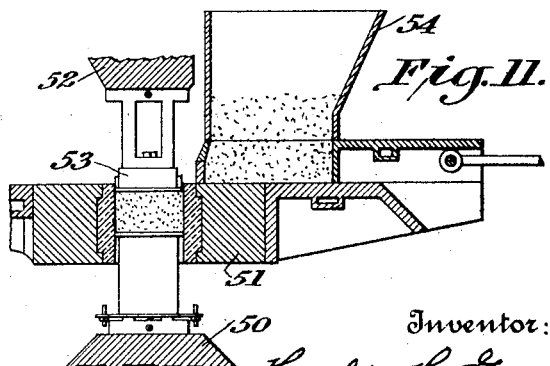

Figs. 10 and 11 show the upper die partly entered into the die box and exerting pressure upon the material. The plates 8 and 9 to which the pressure has been communicated through the material are about to swing about their pivot connection to assume a horizontal position.

Figure 12:
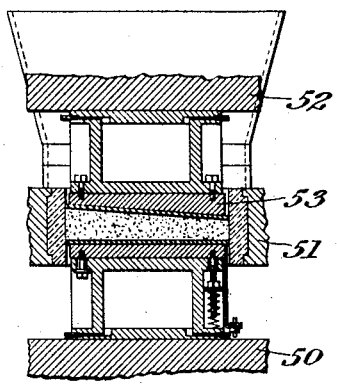
Figure 13:
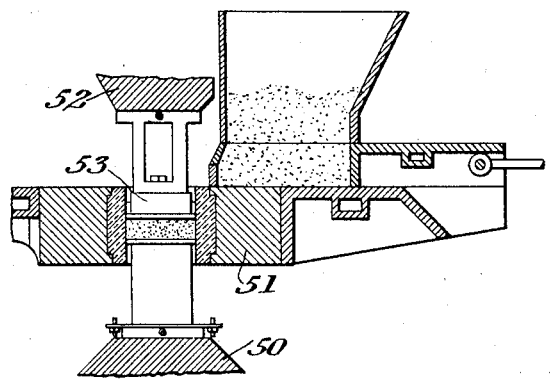

Figs. 12 and 13 show the upper die in its final position during compression and the plates 8 and 9 in horizontal position. The brick is now completely formed and ready to be ejected.

Figure 14:
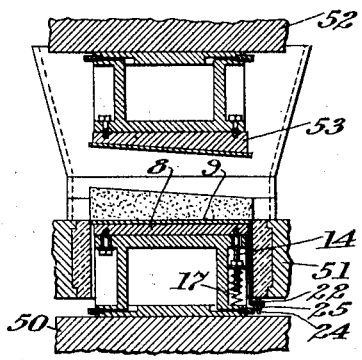
Figure 15:
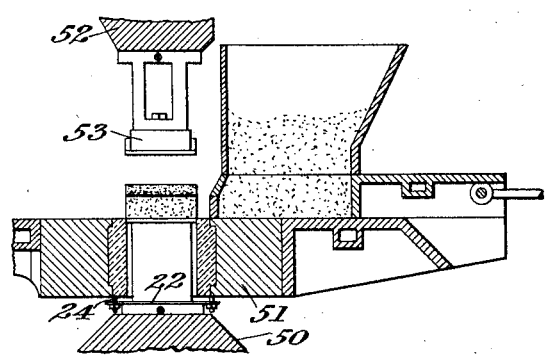

Figs. 14 and 15 show the lower die element raised to lift the pressed brick to a plane which is level with the upper surface of the die box table so that it may be pushed laterally by the returning feed tray. In order to bring the plates 8 and 9 in a horizontal position at the moment that the feed tray pushes over the die box, the screws or studs 24 bear on the under side of the box structure or box table at the proper moment to hold the plates 8 and 9 fixed while the die block continues its upward motion. By means of the nuts 25 the studs 24 may be accurately adjusted so that the plates 8 and 9 are perfectly level with and form a continuation of the upper surface of the box table at the moment the feed tray passes over it.

Figs. 16 and 17 show the brick pushed aside and the feed tray again over the die box to commence a new cycle.

In the drawings the element 8 has been shown as a plate having parallel surfaces to produce a brick tapered on one side only. It is obvious that the form of the element 8 may be suitably modified to produce a brick of double taper.

It is understood that the adjustment of the inclination of the plates 8 and 9 is largely a matter of practical experience, but once the proper adjustment is made, the density of the compressed material will be substantially uniform. The adjustment of the nut 25 is then merely a matter of course.

There is of course considerable latitude in the selection of the mechanical means for carrying out the objects of the invention. I have illustrated a pivoted die plate as an exceedingly simple means to the end desired, but it is obvious that the distribution of material may be effected in other ways within the scope of the invention. The selection of the yielding or resilient means is largely a matter of choice or judgment. The means for leveling the plates 8 and 9 at the moment of discharge may be made effective in various ways without resorting to the particular means indicated.

I therefore do not in any sense limit myself to the specific embodiment illustrated.

Figs. 18, 19 and 20 show a device generally identical with the device shown in Figs. 1-5 inclusive. It merely shows the application of the invention to form a side wedge brick. To more thoroughly balance the yielding elements, two pivot cap screws 30 and two spring supports 31 are used.

I claim:—

1. In a machine for making taper brick, the combination of an upper die having an inclined surface to produce the taper, a lower die, a die box and means constructed and arranged to distribute, during the charging operation, the material in the die box so that the rate of change of density during compression is substantially uniform throughout the body of material compressed.

2. In a machine for making taper brick, the combination of an upper die having an inclined surface to produce the taper, a lower die, a die box and means in the die box constructed and arranged to distribute, during the charging operation, the material therein so that the rate of change of density during compression is substantially uniform throughout the body of the material compressed.

3. In a machine for making taper brick, the combination of an upper die having an inclined surface to produce the taper, a lower die, a die box and means on the lower die constructed and arranged to distribute the material in the die box so that the rate of change of density during compression is substantially uniform throughout the body of the material compressed.

4. In a machine for making taper brick, the combination of an upper die having an inclined surface to produce the taper, a lower die, a die box and means constructed and arranged to distribute, during the charging operation, the material in the die box so that the density resulting from the compression is substantially uniform throughout the compressed body.

5. In a machine for making taper brick, the combination of an upper die having an inclined surface to produce the taper, a lower die, a die box and means operative to cause, during the charging operation, a graded distribution of the material in the die box in the direction of the taper so that the rate of change of density during compression is substantially uniform throughout the body of material compressed.

6. In a machine for making taper brick, the combination of an upper die having an inclined surface to produce the taper, a lower die, a die box and means operative to cause, during the charging operation, a graded distribution of the material in the die box corresponding to the taper of the brick to be formed, whereby when the material is compressed the density will be substantially uniform throughout the body formed.

7. In a machine for making taper brick, the combination of an upper die having an inclined surface to produce the taper, a lower die, a die box and yielding means in the die box constructed and arranged to effect, prior to compression, a graded distribution of the material in the die box substantially in accordance with the taper of the brick to be formed and to assume, during compression, a position which does not interfere with the formation of the brick.

8. In a machine for making taper brick, the combination of an upper die having an inclined surface to produce the taper, a lower die, a die box, a yielding element on the lower die constructed and arranged to effect, before compression, a graded distribution of the material in the die box substantially in accordance with the taper of the brick to be formed, and to assume, during compression, a position which does not interfere with the formation of the brick.

9. In a machine for making taper brick, the combination of an upper die having an inclined surface to produce the taper, a lower die, a die box, a yielding element on the lower die constructed and arranged to assume two limiting positions, one position, before compression, to effect a graded distribution of the material in the die box substantially in accordance with the taper of the brick to be formed, and another position, during compression, substantially in alinement with the working surface of the lower die.

10. In a machine for making taper brick, the combination of an upper die having an inclined surface to produce the taper, a lower die, a die box, a plate yieldingly connected to the lower die and capable of assuming two limiting positions, one position, before compression, inclined in a direction opposite to the inclination of the working surface of the upper die to thereby effect a distribution of the material in the die box substantially in accordance with the taper of the brick to be formed, and another position during compression substantially in alinement with the working surface of the lower die.

11. In a machine for making taper brick, the combination of an upper die having an inclined surface to produce the taper, a lower die block, a die box, a die plate on the lower die block yieldably connected thereto in such a way as to enable it to assume two limiting positions, one position, before compression, inclined in a direction opposite to the inclination of the working surface of the upper die and another position, during compression, which is the normal working position of the surface of the lower die.

12. In a machine for making taper brick, the combination of an upper die having an inclined surface to produce the taper, a lower die block, a die box, a die plate pivotally supported on the lower die block and yieldably supported thereon to assume a position which is inclined in a direction opposite to the inclination of the working surface of the upper die and means for limiting the motion of the die plate to cause it to assume, during compression, the normal working position of the surface of the lower die.

13. In a machine for making taper brick, the combination of an upper die having an inclined surface to produce the taper, a lower block, a die box, a die plate pivotally connected adjacent one end to the lower die block and yieldingly supported thereon near the other end so as to assume a position which is inclined in a direction opposite to the inclination of the working surface of the upper die and means for limiting the pivotal motion of the die plate to cause it to assume, during compression, the normal working position of the surface of the lower die.

14. In a machine for making taper brick, the combination of an upper die having an inclined surface to produce the taper, a lower die block, a die box, a die plate pivotally supported on the lower die block, and resilient means interposed between the die plate and the die block to normally hold the die plate in a plane which is inclined in a direction opposite to the inclination of the working surface of the upper die.

15. In a machine for making taper brick, the combination of an upper die having an inclined surface to produce the taper, a lower die block, a die box, a die plate pivotally supported on the lower die block, resilient means interposed between the die plate and the die block to normally hold the die plate in a plane which is inclined in a direction opposite to the inclination of the working surface of the upper die and means for adjusting at will the angle of inclination of the die plate.

16. In a machine for making taper brick, the combination of an upper die having an inclined surface to produce the taper, a lower die block, a die box, a die plate pivotally supported on the lower die block and adapted to assume a horizontal position, and resilient means interposed between the die plate and the die block to cause the die plate to normally assume an inclined position.

17. In a machine for making taper brick, the combination of an upper die having an inclined surface to produce the taper, a lower die block, a die box, a die plate pivotally supported on the lower die block and adapted to assume a horizontal position, resilient means interposed between the die plate and the die block to cause the die plate to normally assume an inclined position and means for adjustably limiting the angle of inclination thereof.

18. In a machine for making taper brick in combination with a die box, oppositely moving upper and lower die blocks, means on the upper die for defining an inclined working surface and means for moving the lower die element to discharge the formed brick at the upper surface of the die box, a die plate yieldably connected to the lower die block in such a way as to normally assume an inclined position and during compression a horizontal position and means acting on the said die plate to hold it in horizontal position when the lower die element is in discharging position.

19. In a machine for making taper brick in combination with a die box, oppositely moving upper and lower die blocks, means on the upper die for defining an inclined working surface and means for moving the lower die element to discharge the formed brick at the upper surface of the die box, a die plate yieldably connected to the lower die block in such a way as to normally assume an inclined position and during compression a horizontal position and means on the die plate coöperating with a stationary element to hold the die plate in horizontal position when the lower die element is in discharging position.

20. In a machine for making taper brick in combination with a die box, oppositely moving upper and lower die blocks, means on the upper die for defining an inclined working surface and means for moving the lower die element to discharge the formed brick at the upper surface of the die box, a die plate pivotally supported on the lower die block and adapted to assume a horizontal position, resilient means interposed between the die plate and the lower die block for normally causing the die plate to assume an inclined position and means acting on the die plate to force it into horizontal position when the lower die element is in discharging position.

21. In a machine for making taper brick in combination with a die box, oppositely moving upper and lower die blocks, means on the upper die for defining an inclined working surface and means for moving the lower die element to discharge the formed brick at the upper surface of the die box, a die plate pivotally supported on the lower die block and adapted to assume a horizontal position, resilient means interposed between the die plate and the lower die block for normally causing the die plate to assume an inclined position and an arm on the die plate constructed and arranged to engage a stationary element to force the die plate into a horizontal position when the lower die element is in discharging position.

22. In a machine for making taper brick in combination with a die box, oppositely moving upper and lower die blocks, means on the upper die for defining an inclined working surface and means for moving the lower die element to discharge the formed brick at the upper surface of the die box, a die plate pivotally supported on the lower die block and adapted to assume a horizontal position, resilient means interposed between the die plate and the lower die block for normally causing the die plate to assume an inclined position and an arm on the die plate constructed and arranged to engage the under side of the die box when the lower die element is moved into discharge position and to thereby force the die plate into horizontal position.

23. In a machine for making taper brick, a lower die block, a die plate pivotally mounted thereon, and adapted to assume a horizontal position, resilient means for causing the die plate to normally assume an inclined position and means for controlling the angle of inclination.

24. In a machine for making taper brick, a lower die block, a die plate pivotally mounted thereon and adapted to assume a horizontal position, resilient means for causing the die plate to normally assume an inclined position, and side plates on the die plate to form a closure for the angular space intermediate the die plate and the die block.

25. In a machine for making taper brick, a lower die block, a die plate pivotally mounted thereon and adapted to assume a horizontal position, resilient means for normally forcing the die plate to an inclined position and an arm on the die plate extending in the direction of motion of the die block and having a lateral projection adapted to engage the die box structure to thereby cause an angular movement of the die plate about its pivot when the die block is moved upwardly through the die box.

In testimony whereof I affix my signature.

HAROLD H. GOE.